(12) United States Patent
Stolkin et al.

(10) Patent No.: US 8,374,388 B2
(45) Date of Patent: Feb. 12, 2013

(54) REAL-TIME TRACKING OF NON-RIGID OBJECTS IN IMAGE SEQUENCES FOR WHICH THE BACKGROUND MAY BE CHANGING

(76) Inventors: Rustam Stolkin, London (GB); Ionut Florescu, Hoboken, NJ (US)

( * ) Notice: Subject to any disclaimer, the term of this patent is extended or adjusted under 35 U.S.C. 154(b) by 1086 days.

(21) Appl. No.: 12/317,317

(22) Filed: Dec. 22, 2008

(65) Prior Publication Data

US 2010/0067741 A1 Mar. 18, 2010

Related U.S. Application Data

(60) Provisional application No. 61/009,456, filed on Dec. 28, 2007.

(51) Int. Cl.
*G06K 9/00* (2006.01)

(52) U.S. Cl. ........................................................ 382/103

(58) Field of Classification Search ........................ None
See application file for complete search history.

(56) References Cited

U.S. PATENT DOCUMENTS

| | | | |
|---|---|---|---|
| 6,394,557 B2 | 5/2002 | Bradski | |
| 6,590,999 B1 * | 7/2003 | Comaniciu et al. | 382/103 |
| 7,366,325 B2 * | 4/2008 | Fujimura et al. | 382/104 |
| 2005/0100192 A1 * | 5/2005 | Fujimura et al. | 382/103 |
| 2007/0122001 A1 * | 5/2007 | Wang et al. | 382/103 |
| 2007/0237359 A1 * | 10/2007 | Sun | 382/103 |
| 2007/0291984 A1 * | 12/2007 | Yang et al. | 382/103 |
| 2008/0133434 A1 * | 6/2008 | Asar et al. | 706/12 |
| 2010/0067741 A1 * | 3/2010 | Stolkin et al. | 382/103 |

OTHER PUBLICATIONS

Stolkin, "Continuous Machine Learning in Computer Vision—Tracking with Adaptive Class Models" pp. 265-282, Scene Reconstruction, Pose Estimation and Tracking, Book edited by: Rustam Stolkin, ISBN 978-3-902613-06-6, pp. 530, I-Tech, Vienna, Austria, Jun. 2007.*

U.S. Appl. No. 61/009,456, filed Dec. 28, 2007, Stolkin.

Stolkin et.al. "Efficient visual servoing with the ABCshift tracking algorithm". Proc. IEEE ICRA, 2008.

R. Stolkin, et.al. "An adaptive background model for CAMSHIFT tracking with a moving camera". Proc. ICAPR, 2007.

Stolkin, "Continuous Machine Learning in Computer Vision—Tracking with Adaptive Class Models", in Pose estimation and tracking, 2007.

Bradski, Computer video face tracking for use in a perceptual user interface, Intel Technology Journal, 1998.

Comaniciu et al.,"Kernel-based object tracking." , IEEE Trans. PAMI, 2003.

* cited by examiner

*Primary Examiner* — Bhavesh Mehta
*Assistant Examiner* — Tahmina Ansari

(57) ABSTRACT

A method and apparatus is disclosed for tracking an arbitrarily moving object in a sequence of images where the background may be changing. The tracking is based on visual features, such as color or texture, where regions of images (such as those which represent the object being tracked or the background) can be characterized by statistical distributions of feature values. The method improves on the prior art by incorporating a means whereby characterizations of the background can be rapidly re-learned for each successive image frame. This makes the method robust against the scene changes that occur when the image capturing device moves. It also provides robustness in difficult tracking situations, such as when the tracked object passes in front of backgrounds with which it shares similar colors or other features. Furthermore, a method is disclosed for automatically detecting and correcting certain kinds of errors which may occur when employing this or other tracking methods.

19 Claims, 9 Drawing Sheets
(8 of 9 Drawing Sheet(s) Filed in Color)

REAL-TIME TRACKING OF NON-RIGID OBJECTS IN IMAGE SEQUENCES FOR WHICH THE BACKGROUND MAY BE CHANGING

CROSS REFERENCE TO RELATED APPLICATIONS

This application claims the benefit of Provisional Patent Application Ser. No. 61/009,456 filed 2007 Dec. 28 by the present inventors, which is incorporated by reference.

FIELD OF THE INVENTION

The present invention pertains generally to the field of image processing, computer vision, and object tracking. In particular the invention discloses a method and apparatus that allows a computer to track the location of non-rigid moving or stationary objects, appearing as an image in a sequence of images, wherein the background scene may be changing or the camera may be moving.

BACKGROUND OF THE INVENTION

Robust and flexible tracking algorithms, requiring minimal training and computational resources, are highly desirable for applications such as robot vision, wide area surveillance, perceptual user interface, smart rooms, video conferencing and video compression all of which may necessitate moving cameras. Examples of conventional methods of tracking objects in a scene include background subtraction, edge detection, and optical flow. These methods tend to be very computationally intensive. Furthermore, such systems are notoriously difficult to train and calibrate. The results produced by such methods often contain a significant amount of noise such that the results must be filtered before they can be used for practical purposes. This additional filtering adds more computational expense. Other tracking techniques track objects as blobs or regions according to learned color models. Some of these techniques are relatively fast and flexible but suffer from other difficulties, such as a tendency to fail if the tracked object moves past regions of background with which it shares significant colors.

Furthermore, many of the above methods are designed for tracking moving targets from a camera which itself is stationary. Such approaches are not suitable for applications where the camera moves, for example if a surveillance camera is mounted on a motorized pan-tilt platform, or for robotic vision systems mounted on moving robots.

Therefore, it would be desirable to have a simple and computationally cheap method for visually tracking a deformable dynamic object from a camera which itself may be moving. More specifically, it would be useful to have a method which contains a means by which information about the scene background can be continually reacquired or re-learned in each new image frame, thereby coping with the rapid scene changes which typically occur under conditions of camera motion. Additionally, relearned background information can usefully enable successful tracking in difficult circumstances where the tracked object passes in front of backgrounds with which it shares significant colors or other features.

SUMMARY OF THE INVENTION

The method of the present invention enables visual tracking of arbitrarily moving non-rigid objects, based on statistical models or other characterizations of the colors, intensities, textures or other kinds of numerical data, that may be associated with image pixels that represent the tracked object and the background. The method achieves robustness by completely relearning its representation of background features at every frame, without erroneously learning that the background looks like the tracked object. In the method, an algorithm assigns weights to image pixels according to their likelihood of representing the tracked object. The object is tracked by looking for the centroid of these weights in each image. By continuously re-learning the background representation, the method of the present invention is able to take account of background changes that may result from camera motion, and also is able to successfully track in difficult circumstances such as when the tracked object moves past regions of background with which it shares similar colors or other features. Hardware that may be employed in this method includes a video camera, a video digitizer and a computer programmed to execute the algorithm of the disclosed embodiment.

DESCRIPTION OF PRIOR ART

A few patents mention computer vision algorithms designed for tracking non-rigid objects, for example,

| U.S. Pat. No. 6,394,557 | Bradski (2002) |
| U.S. Pat. No. 6,590,999 | Comaniciu et al. (2003) |

The method of tracking objects in video images that is disclosed in U.S. Pat. No. 6,394,557 (hereafter referred to as "the '557 Patent") assumes that the background scene in the video sequence is unchanging, i.e. it uses a background model that remains unchanged throughout the duration of the tracking procedure. A consequence of this is that this method tends to fail if the background changes, for example in applications where the camera moves. This method also has a particular tendency to fail if the tracked object moves past regions of background with which it shares significant colors.

The method of tracking objects in video images that is disclosed in U.S. Pat. No. 6,590,999 (hereafter referred to as "the '999 Patent") examines only a small region of each video image which is of a similar size and shape to that of the tracked object. The region is initialized either at the last known image position of the tracked object or at a position predicted from the previous motion of the tracked object through the use of a Kalman filtering technique. Hence, if the true image location of the object is more than one object diameter away from where it is predicted to be, then this algorithm is likely to fail (i.e. lose track of the object).

BRIEF DESCRIPTION OF THE DRAWINGS

For a more complete understanding of the present invention, reference is made to the following detailed description of various exemplary embodiments considered in conjunction with the accompanying drawings.

The file of this patent contains at least one color image. Copies of the patent publication with color drawing(s) will be provided by the U.S. Patent and Trademark Office upon request and payment of the necessary fees.

Color photographs are included since one exemplary embodiment of the method of the present invention involves using color information to track moving targets in sequences of color images and thus the workings of the method can be usefully demonstrated with examples of such images.

Figure 1:
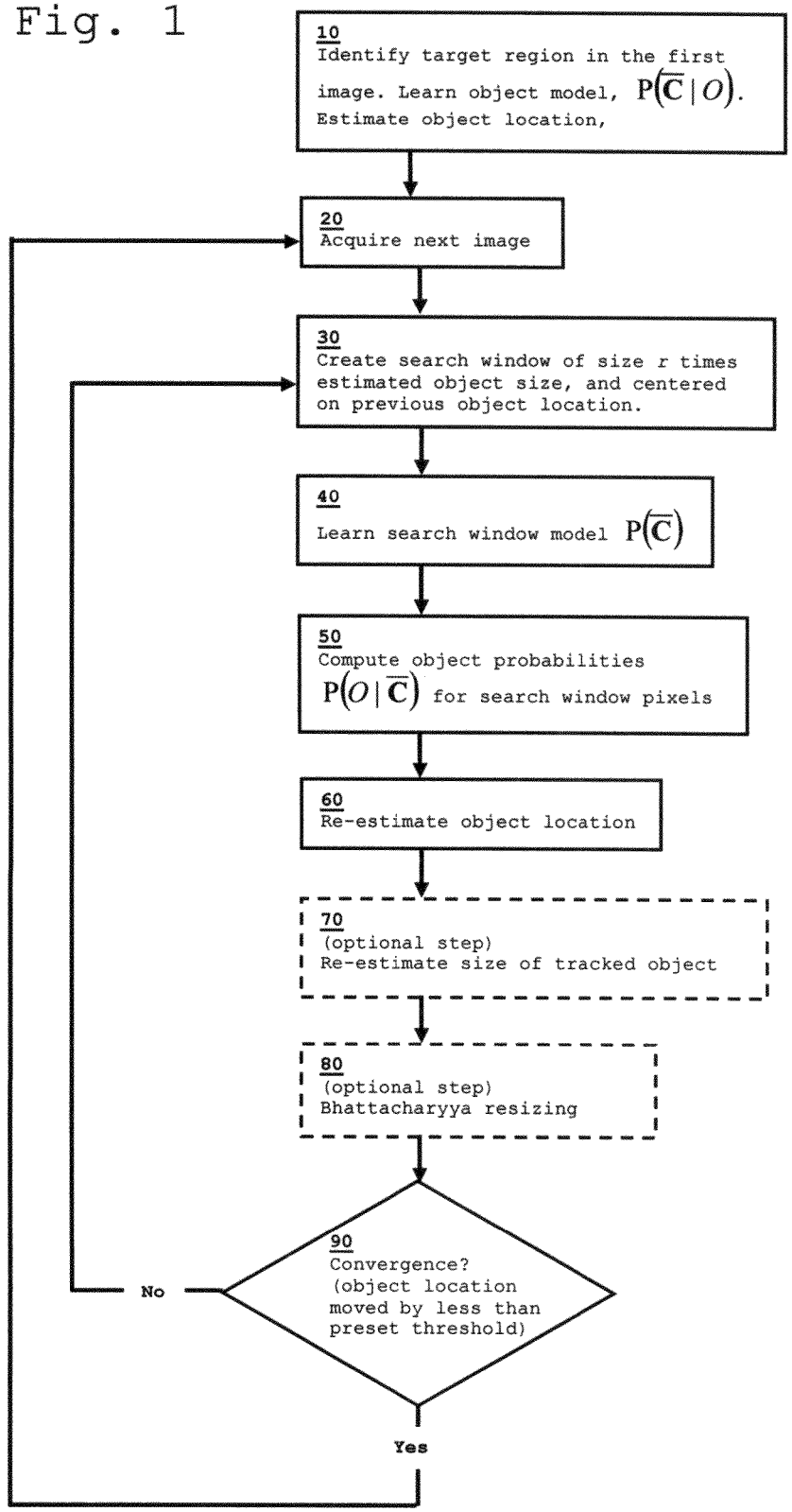
Figure 2:
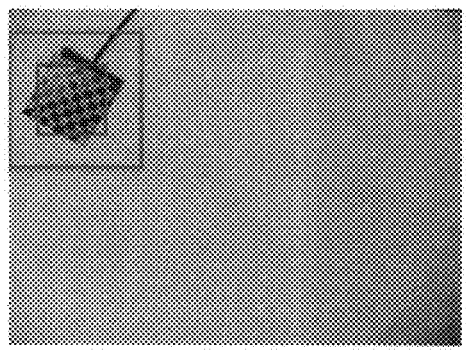
Figure 2:
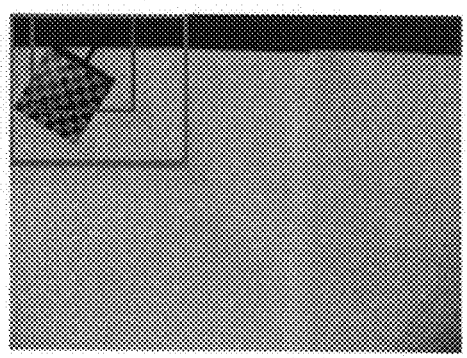
Figure 2:
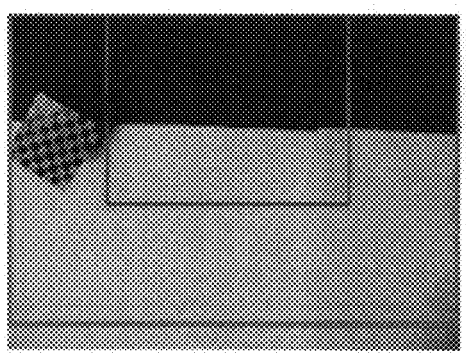
Figure 2:
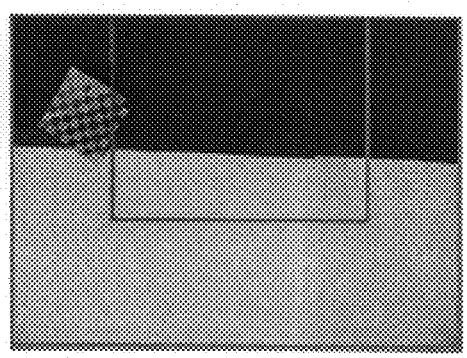
Figure 2:
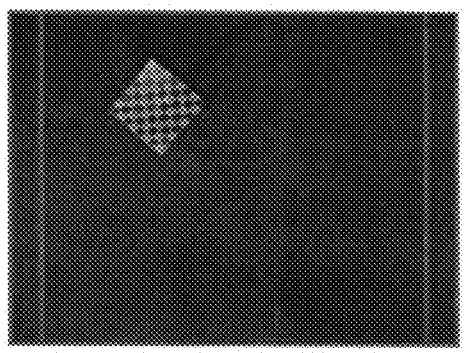
Figure 3:
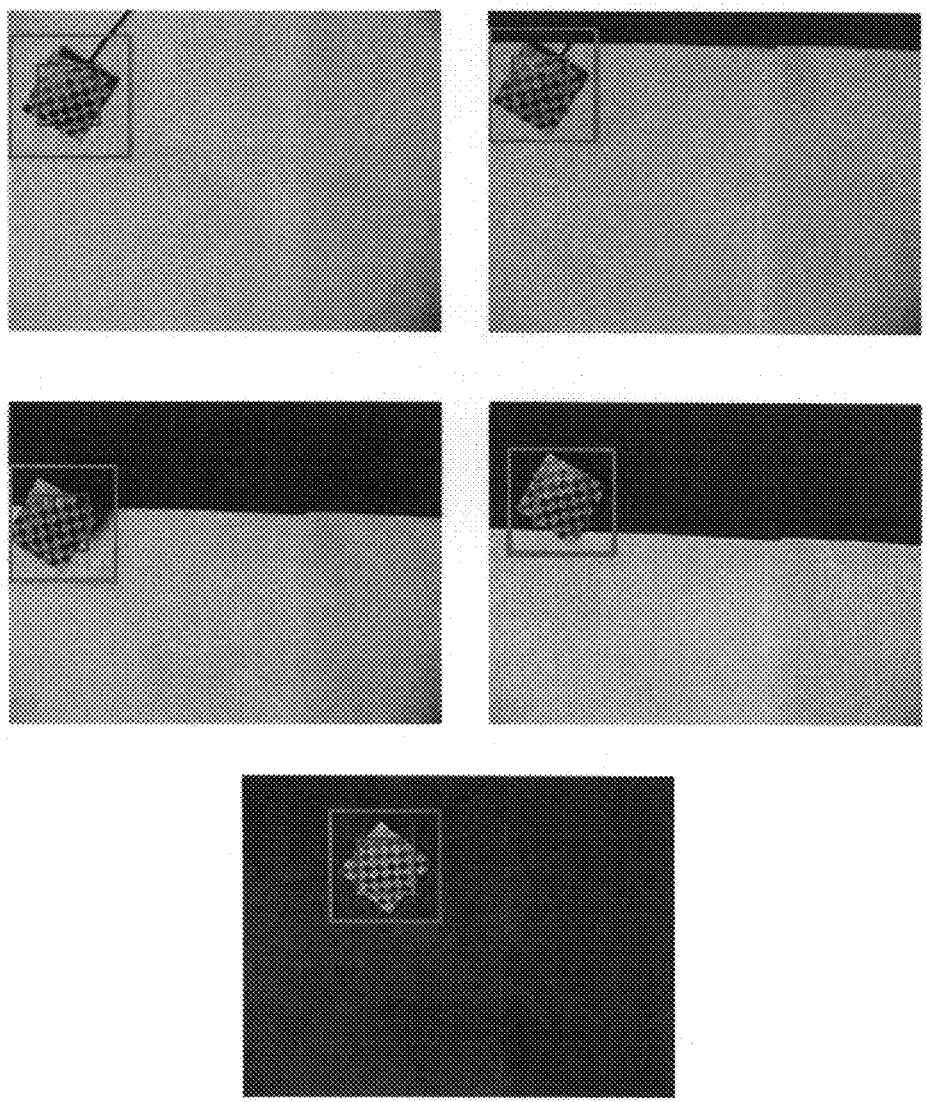
Figure 4:
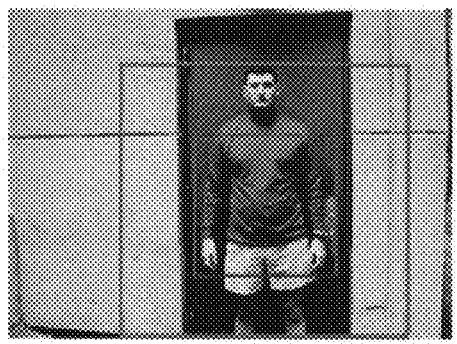
Figure 4:
Figure 4:
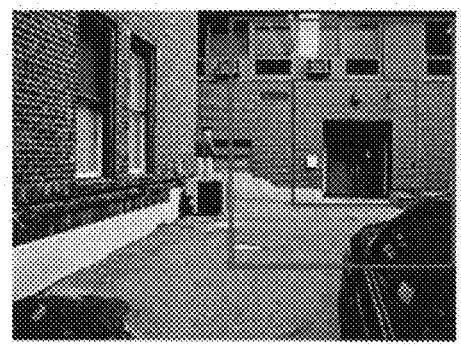
Figure 4:
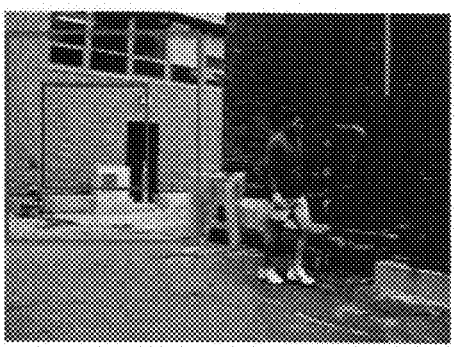
Figure 4:
Figure 5:
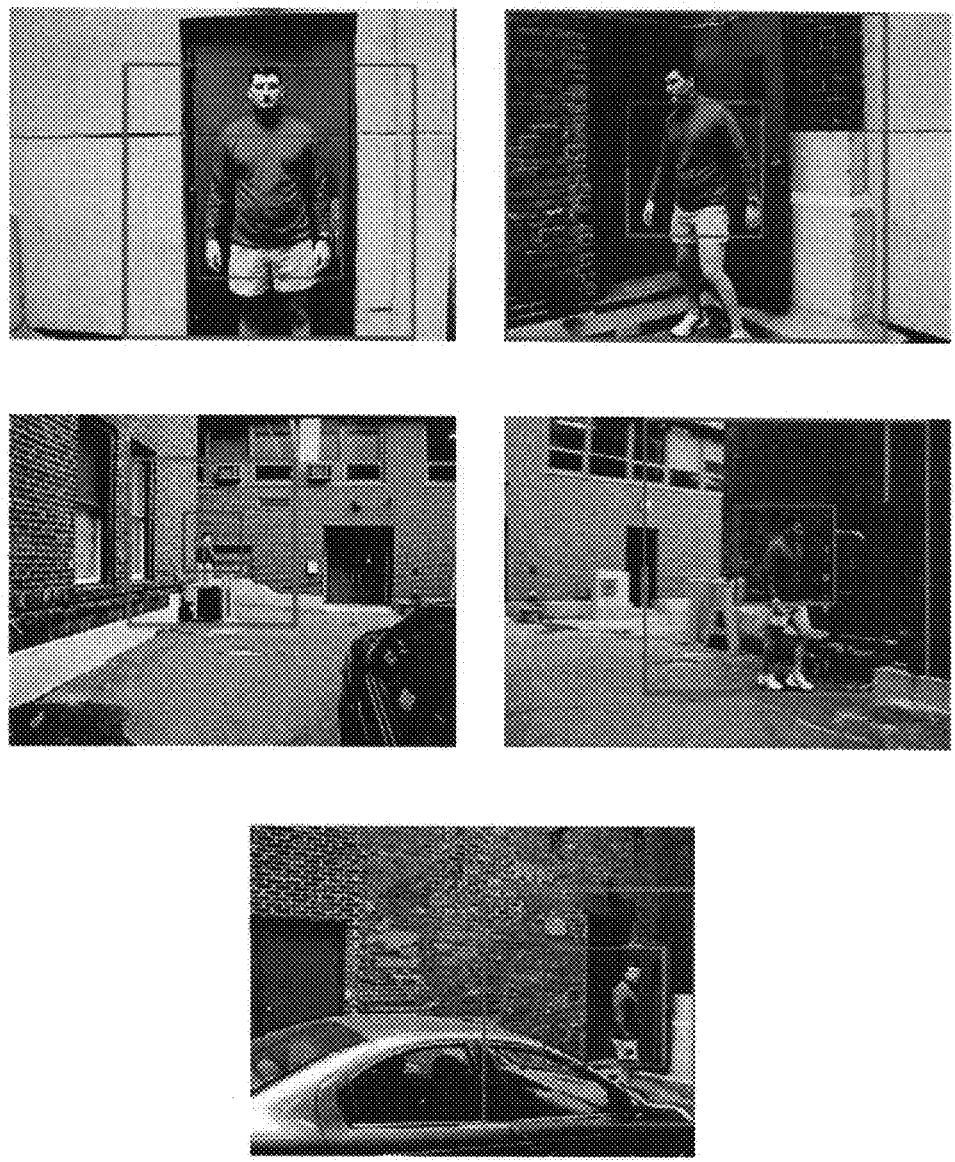
Figure 6:
Figure 6:
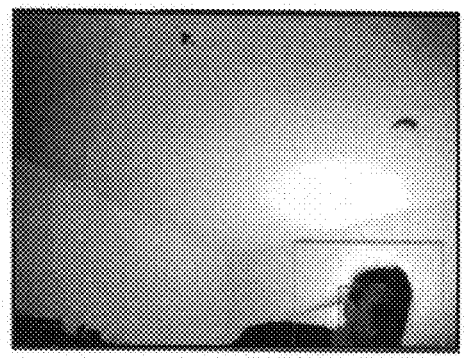
Figure 6:
Figure 6:
Figure 6:
Figure 7:
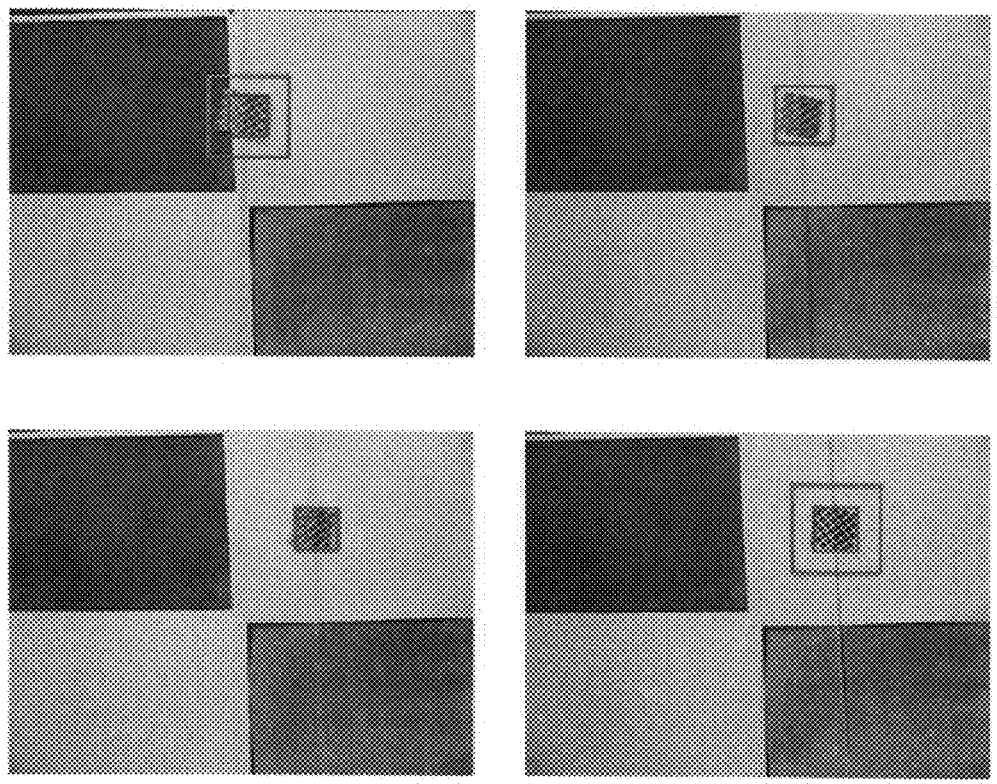
Figure 8A:
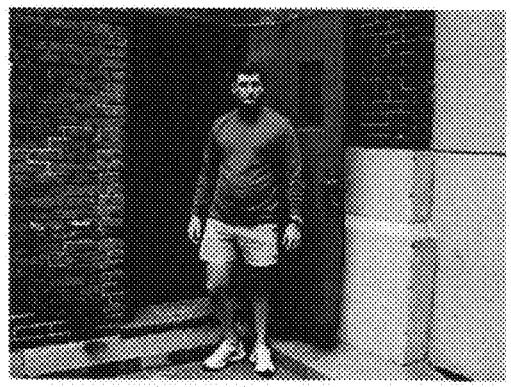
Figure 8B:
Figure 8C:
Figure 9:
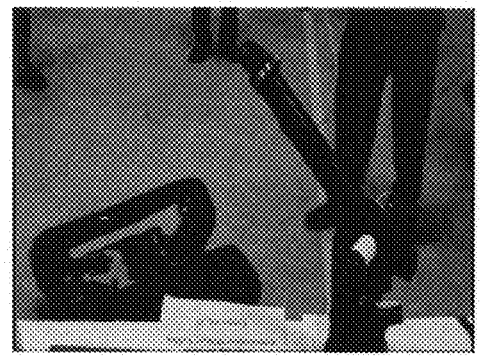
Figure 9:
Figure 9:
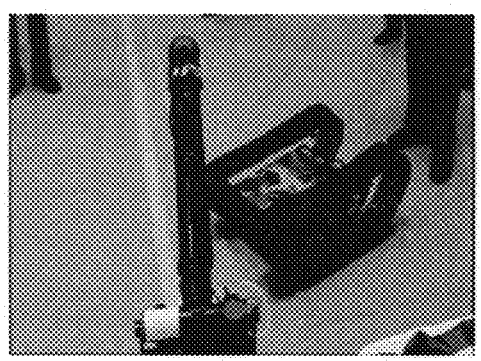
Figure 9:
Figure 9:
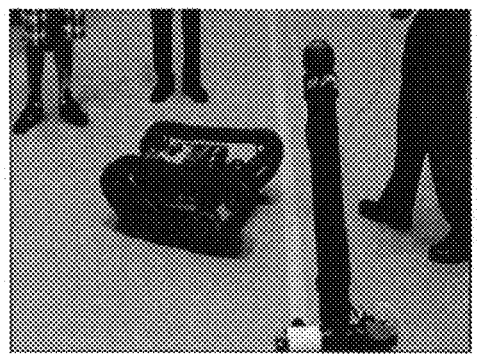
Figure 9:

FIG. 1 illustrates in block diagram form the tracking technique of the present invention;

FIG. 2 is a series of video frames showing the tracking of a two-colored object across a two-colored background using an object tracking method in the prior art;

FIG. 3 is a series of video frames depicting the tracking of a two-colored object across a two-colored background using an object tracking method according to an embodiment of the present invention;

FIG. 4 is a series of video frames showing the tracking of a human subject in a cluttered environment using an object tracking method in the prior art;

FIG. 5 is a series of video frames showing the tracking of a human subject in a cluttered environment using an object tracking method according to an embodiment of the present invention;

FIG. 6 is a series of video frames illustrating the robustness of tracking a rapidly moving human face using an object tracking method according to an embodiment of the present invention;

FIG. 7 illustrates the automatic resizing of the search window using a similarity metric, using an object tracking method according to an embodiment of the present invention;

FIG. 8a illustrates a particular frame of an image sequence;

FIG. 8b depicts a map of object probabilities of each pixel in FIG. 8, said probabilities calculated according to the method of the present invention. In this probability map, the brightness of each pixel denotes the probability that said pixel represents the object being tracked (brighter means higher probability);

FIG. 8c depicts a map of object probabilities of each pixel in FIG. 8, said probabilities calculated according to a method of the prior art. In this probability map, the brightness of each pixel denotes the probability that said pixel represents the object being tracked (brighter means higher probability);

FIG. 9 illustrates an apparatus (camera mounted on a motorized boom) tracking a moving object (a mobile robot vehicle) in the presence of moderate clutter (people), according to an embodiment of the present invention. The motorized camera apparatus is automatically steered so as to maintain the tracked object within the field of view of the camera.

While the patent invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DETAILED DESCRIPTION OF A PREFERRED EMBODIMENT OF THE INVENTION

A method and apparatus for object tracking in image sequences where the background may be changing is disclosed. A critical feature of the invention is a means by which characterizations of the background are continuously adapted or re-learned during tracking.

In the following description, for purposes of explanation, specific nomenclature is set forth to provide a thorough understanding of the present invention. However, it will be apparent to one skilled in the art that these specific details are not required in order to practice the current invention. For example, the present invention is often described herein with reference to probability distributions based on color histograms. However, it should be understood that this embodiment is merely exemplary. For example, the method of the present invention could also be made to work using other kinds of probability distributions such as Gaussians, mixture models or other kinds of distribution, or other representations or characterizations. Such distributions, histograms or representations might encode various kinds of image data in one, two or multiple dimensional histograms or distributions. All such variations and modifications are intended to be included within the scope of the present invention. Furthermore, although the invention will often herein be explained with reference to an exemplary embodiment which utilizes color data associated with image pixels, this embodiment is merely exemplary. Thus the characterizations of the tracked object, background or regions of an image may incorporate color information such as normalized RGB. However, many other methods exist for defining the intensities and colors of image pixels. Such methods may include, but are not limited to, the color representations known by those skilled in the art as LUV, LAB, HSV, rgb, RGB, or other color representations. Furthermore, 1D, 2D, 3D or other types of histogram, probability distribution or other representation can be used to incorporate data from only one, two or all three color modes when implementing the method of the present invention. Higher dimensional histograms, distributions or other representations can be used to make use of larger numbers of other kinds of pixel features. All such variations and modifications are intended to be included within the scope of the present invention. Furthermore, the method of the present invention is not limited to the use of color data. Our invention can make use of any kind of image feature or features which can be represented by associating each pixel of an image with a number. For example, it is possible to use edge detection algorithms to assign a number to every pixel in an image, said number representing the "edginess" of said pixel. Other methods are known to those skilled in the art whereby each pixel in an image can be assigned a number or numbers which represent the texture in a small region of the image which is local to said pixel. Alternatively, infra red cameras or thermal imaging devices can associate a number with each pixel of an image which represents the temperature of the object which said pixel is depicting. Medical imaging devices may represent other kinds of data by associating numbers with pixels. It should be understood that any, all, or a mixture of such features or pixel data can be incorporated into the method of the present invention, and our invention is thus not limited to the art of tracking using color information. All such variations and modifications are intended to be included within the scope of the present invention.

Bayesian Mean Shift Tracking with Static Color Models

We now describe an exemplary embodiment of the invention which makes use of color features.

The object tracker of the '557 Patent was designed for face tracking at close range from a stationary camera in relatively simple indoor environments. It often fails if the camera moves, because it relies on static models of both the background and the tracked object.

For each frame of an image sequence, meanshift type trackers exemplified by the algorithm used in the object tracker of the '557 Patent, look at pixels which lie within a subset of the image defined by a "search window" (i.e., the green box in FIGS. 2-7). Each pixel in this window is assigned a probability that it belongs to the tracked object, creating a 2D distribution of object location over a local area of the image. The centroid of this distribution can be regarded as the probabilistic expectation of the true object position, and thus provides an improved object position estimate. The search window is now repositioned at this centroid and the process is iterated until convergence. This iterative convergence of a local window towards the mean (expectation) position of a probability distribution is known as the "mean shift" procedure. The algorithm of the object tracker of the '557 Patent is known as the "Continuously Adaptive Mean Shift" or CAMSHIFT tracker. The algorithm of the object tracker of the '999 Patent is often known as the "Meanshift Tracker" by those skilled in the art. In the context of the CAMSHIFT tracker, the use of the term "adaptive" does not imply any continuous machine learning of models of the tracked object or the background. CAMSHIFT is only "adaptive" in the sense that the tracked object size is re-estimated at each frame to indicate whether the object is moving towards or away from the camera.

The size of the tracked object region (in pixels) is estimated by summing the probabilities of all the pixels within the search window. The object region can now be indicated by marking out a simple area of this size around the object centroid (i.e., the red box in FIGS. 2-7). The search window is now resized so that its area is always in a fixed ratio to this estimated object area.

The tracked object is modeled as a class conditional color distribution, $P(\overline{C}|O)$. Depending on the application, 1D Hue, 3D normalized RGB, 2D normalized RG, UV, ab histograms or other representations may all be appropriate choices of color model, the important point being that these are all distributions which return a probability for any pixel color, given that the pixel represents the tracked object. These object distributions can be learned offline from training images, or during initialization, e.g. from an area which has been user designated as object in the first image of the sequence, or an image region which has been automatically detected as a moving target by some other kind of vision algorithm (e.g. a background subtraction technique).

The object probabilities can now be computed for each pixel using Bayes' law as:

$$P(O|\overline{C}) = \frac{P(\overline{C}|O)P(O)}{P(\overline{C})}, \quad (1)$$

where $P(O|\overline{C})$ denotes the probability that the pixel represents the tracked object given its color, $P(\overline{C}|O)$ is the color model learned for the tracked object and $P(O)$ and $P(\overline{C})$ are the prior probabilities that the pixel represents object and possesses the color, $\overline{C}$, respectively. For example, FIG. 8 shows results of assigning probabilities to image pixels according to their likelihoods of representing the tracked object.

The denominator of equation (1) can be expanded as:

$$P(\overline{C}) = P(\overline{C}|O)P(O) + P(\overline{C}|B)P(B) \quad (2)$$

where $P(B)$ denotes the prior probability that the pixel represents background. In the prior art exemplified by the '557 Patent, values of 0.5 are suggested for both $P(O)$ and $P(B)$. However, this choice is difficult to justify if one takes these terms to denote the expected fractions of the total search window area containing object and background pixels respectively. Instead, in an algorithm for an embodiment of the object tracker of the present invention, values are assigned to object priors in proportion to their expected image areas. If the search window area is always resized to be r times bigger than the estimated tracked object area, then $P(O)$ is assigned the value $1/r$ and $P(B)$ is assigned the value $(r-1)/r$.

The color histograms, $P(\overline{C}|O)$ and $P(\overline{C}|B)$, are the class conditional object and background models respectively. As for the object model, the prior art exemplified by the '557 Patent also suggests learning the background model offline, presumably building a static $P(\overline{C}|B)$ histogram from an initial image. While it is often reasonable to maintain a static distribution for the tracked object (since objects are not usually expected to suddenly change color), a static background model is unrealistic when the camera moves, thus continually viewing a new or changed background scene. Therefore the CAMSHIFT algorithm can rapidly fail when the background scenery changes since colors may exist in the new scene which did not exist in the original distribution, such that the expressions in Bayes law will no longer hold true and calculated probabilities will no longer add up to unity.

Particular problems arise with CAMSHIFT if the tracked object moves across a region of background with which it shares a significant color. In such a case, a large region of background may easily become mistaken for the object, as illustrated by FIG. 2 and FIG. 4. FIG. 8c shows an example where CAMSHIFT has erroneously assigned high object probabilities to background pixels because they share similar colors with the tracked object. In this case pixels representing a red doorway are being mistaken for the tracked object, being a person wearing a red shirt.

By using equation (1) to assign probabilities to each pixel within the search window, it is possible to build up a 2D distribution of object location over the image region of interest. The new $\hat{x}, \hat{y}$ co-ordinates of the tracked object can be re-estimated using the formula:

$$\hat{x}_{n+1} = \frac{\sum_{(x,y) \in R_n} xP(O|\overline{C}_{x,y})}{\sum_{(x,y) \in R_n} P(O|\overline{C}_{x,y})} \quad (3)$$

$$\hat{y}_{n+1} = \frac{\sum_{(x,y) \in R_n} yP(O|\overline{C}_{x,y})}{\sum_{(x,y) \in R_n} P(O|\overline{C}_{x,y})},$$

where $\hat{x}_{n+1}$ and $\hat{y}_{n+1}$ are the new estimates of the center of the object derived from the probabilities of pixels at all (x,y) located in the region of interest, $R_n$, at the n-th iteration, and where $\overline{C}_{x,y}$ denotes the color of the pixel at image position (x,y).

Incorporating an Adaptive Background Model

While employing the aforementioned Bayesian mean shift methods, the algorithm used in an embodiment of the object tracker of the present invention uses a background model which can be continuously relearned. This model can be relearned without the need to decisively classify any pixels as being either object or background. Due to the continuously relearnable background model, this embodiment of the object tracker of the present invention has been named the ABCshift ("Adaptive Background CAMSHIFT") algorithm.

Rather than using an explicit $P(\overline{C}|B)$ histogram, the ABCshift algorithm builds a $P(\overline{C})$ histogram which is recomputed every time the search window is moved, based on all of the pixels which lie within the current search window. $P(\overline{C})$ values, looked up in this continuously relearned histogram, can now be substituted as the denominator for the Bayes' law expression of equation (1). Since the object distribution, P( $\overline{C}|O)$, remains static throughout the tracking, this process becomes equivalent to implicitly relearning the background distribution, $P(\overline{C}|B)$, because $P(\overline{C})$ is composed of a weighted combination of both these distributions (see equation (2)). Relearning the whole of P(O), rather than explicitly relearning $P(\overline{C}|B)$, avoids the need to make hard decisions about the class of any particular pixel and helps ensure that probabilities add up to unity (e.g. if there are small errors in the static object model, $P(\overline{C}|O)$).

Adaptively relearning the background distribution helps prevent tracking failure when the background scene changes, particularly useful when tracking from a moving camera (FIGS. 2-6). Additionally, it enables objects to be tracked, even when they move across regions of background which are of a similar color as a significant portion of the object (FIGS. 2-5). This is because, once $P(\overline{C})$ has been relearned, the denominator of Bayes' law (equation (1)) ensures that the importance of this color will be diminished. In other words, the tracker adaptively learns to ignore object colors which are similar to the background and instead tends to focus on those colors or features of the object which are most dissimilar to whatever background is currently in view.

It is useful to note that the continual relearning of the $P(\overline{C})$ histogram need not substantially increase computational expense. Once the histogram has been learned for the first image it is only necessary to remove from the histogram those pixels which have left the search window area, and add in those pixels which have newly been encompassed by the search window as it shifts with each iteration. Provided the object motion is reasonably slow relative to the camera frame rate, the search window motion will be small, so that at each iteration only a few lines of pixels need be removed from and added to the $P(\overline{C})$ histogram.

If the $P(\overline{C})$ histogram is relearned only once every frame, the speed should be similar to that of CAMSHIFT. However, if the histogram is relearned at every iteration, some additional computational expense is incurred, since to properly exploit the new information it is necessary to recompute the $P(O|\overline{C})$ values for every pixel, including those already analyzed in previous iterations. Theoretically, updating at each iteration should produce more reliable tracking, although good tracking results are observed with both options.

In practice, ABCshift may often run significantly faster than CAMSHIFT. Firstly, the less accurate background model representation can cause CAMSHIFT to need more iterations to converge. Secondly, the less accurate tracking of CAMSHIFT sometimes causes it to automatically grow a larger search window area, so that far greater numbers of pixels must be handled in each calculation, see FIG. 2 and FIG. 4.

Initialization

The method of the present invention must be initialized by designating a target region. Said initialization comprising several possible alternative techniques, including but not limited to:

a) A human user or operator may manually designate a region of one the frames in the image sequence. In one embodiment of the present invention, a video camera is functionally connected to a computer. A human operator can use a computer mouse or other pointing device to move a pointer over said image displayed on the screen of said computer and can define an image region by operating the mouse controls. However, it should be understood that this particular embodiment is merely exemplary, and that a person skilled in the art could apply many possible alternative methods to enable a human operator to designate an image region for the purpose of initializing the present method. All such variations and modifications are intended to be included within the scope of the present invention.

b) A human user or operator using a mouse or other computer pointing device to specify a single point within the image region which represents the object to be tracked. Image processing methods are then used to interpret pixels in a region surrounding said user specified single point and to automatically identify those pixels which represent the tracked object, thus identifying said target region for initialization of the method of the present invention.

c) Video footage of the scene in which tracking is to be undertaken is displayed on a screen or other viewing device. A region of the viewed scene is defined, for example by highlighting the region on the screen in some way. When an object of interest enters said defined region, a human user or operator indicates object presence to the computer, either by pressing a button, operating a control or emitting or causing to be emitted some signal that the computer is equipped to recognize. The computer then initializes the algorithm, using the highlighted region as the target region. For example, in one possible embodiment of the method, a video camera is functionally connected to a computer. A red box is displayed in the center of successive video images, captured by said camera and displayed on the screen of said computer. If an object of interest appears in the video images and enters the region defined by the red box, a human operator can initialize tracking by pressing a button on the keyboard of said computer. Said button pressing indicates to the computer that the image frame during which the button was pressed is to be the first image of a sequence of images throughout which said object of interest is to be tracked and furthermore indicates that the image region defined by the red box is to be used as the target region. See FIG. 6 for an illustration. However, it should be understood that this particular embodiment is merely exemplary, and that a person skilled in the art could apply many possible variations or alternative methods to enable a human operator to indicate the presence of an object of interest within a designated region of a video image. All such variations and modifications are intended to be included within the scope of the present invention.

d) A person skilled in the art will be aware of many other kinds of algorithms for both detecting and or tracking objects of interest in successive frames of a video sequence. These algorithms may typically include, but are not limited to, methods involving motion detection, background subtraction or other methods for detecting new target objects of interest as regions of change in successive images of the video sequence. One way of initializing the method of the present invention would be for such an alternative algorithm, known within the arts of image processing or computational vision, to be used to either automatically detect a new object of interest or to track the object of interest through a plurality of images from an image sequence, before automatically passing information to an embodiment of the present invention as regards the appropriate region in an initial frame of a further sequence of images, which can be used as the target region.

e) A model of the object to be tracked could be learned off-line using a series of images or photographs that would be representative for the object of interest. Then the computer running the algorithm would search for the most similar region of a real time image using a Bhattacharyya or other similarity metric. Once the metric distance is less than a threshold the computer automatically designates the said region of the real-time image as the target region.

It should be understood that a person skilled in the art may employ many different methods for initializing the method of the present invention and for determining the target region, of the first in a sequence of images, which represents the object to be tracked. All such methods of initialization are intended to be included within the scope of the present invention.

Summary of the ABCshift Object Tracker

The ABCshift algorithm may be summarized as follows (see FIG. 1):
1. Identify an object region in the first image and train the object model, $P(\overline{C}|O)$.
2. Center the search window on the estimated object centroid and resize it to have an area r times greater than the estimated object size.
3. Learn the color distribution, $P(\overline{C})$, by building a histogram of the colors of all pixels within the search window.
4. Use Bayes' law (equation (1)) to assign object probabilities, $P(O|\overline{C})$, to every pixel in the search window, creating a 2D distribution of object location.
5. Estimate the new object position as the centroid of this distribution and estimate the new object size (in pixels) as the sum of all pixel probabilities within the search window.
6. Repeat steps 2-5 until the object position estimate converges.
7. Return to step 2 for the next image frame.

Note that the size re-estimation parts of steps two and five are optional and can often be omitted. If these steps are omitted, the object and search windows will remain constantly the same size throughout the tracking. Such omissions can make tracking more stable, but at the cost of not inferring size/range information for each frame. Said method of tracking while omitting the step of search window re-sizing is also intended to be included within the scope of the present invention. Also, alternative approaches to re-estimating the size of the tracked object can easily be combined with the ABCshift object tracking approach. It should be understood that persons skilled in the art may find many alternative methods for re-estimating the size of the tracked object in successive image frames and for re-sizing the search window, and that incorporating these variations and alternatives within the disclosed tracking method would still fall within the spirit of the present invention. All such variations and modifications are intended to be included within the scope of the present invention.

Bhattacharyya Resizing

The ABCshift object tracking method can be used with a constant search window size, without resizing the search window or estimated object size at each frame. If it is chosen to attempt to re-estimate the size of the tracked object at each frame, either as described above or by employing some other technique, a special mode of instability can sometimes be introduced which occasionally causes problems. If the search window should shrink, due, for example, to the object region being temporarily underestimated in size, to such an extent that the boundaries of the search window approach the boundaries of the true object region, then the background model will be retrained, predominantly using object pixels. This in turn will lead to many object pixels being assigned a high probability of belonging to the background and even more object pixels become incorporated into the background model. Thus the estimated object region shrinks in size with a corresponding shrinking in the search window. This results in an unstable feedback cycle with the estimated object region and search window gradually, and irrecoverably collapsing.

According to an embodiment of the present invention, as the search window shrinks and approaches the size of the object region, the learned search window distribution, $P(\overline{C})$, must become increasingly similar to the static distribution known for the tracked object, $P(\overline{C}|O)$. If this increasing similarity can be detected, then both the object region and search window can be easily resized, the correct enlargement factor being r, the desired ratio of search window size to object region size.

Several statistical measures exist for comparing the similarity of two histograms. The algorithm used in an embodiment of the present invention utilises a Bhattacharyya metric, sometimes referred to as Jeffreys-Matsusita distance, which for two histograms, $p = p_{i_{i \in \{1, 2, \ldots, K\}}}$ and $q = q_{i_{i \in \{1, 2, \ldots, K\}}}$ is defined as:

$$d(p, q) = \sqrt{\sum_{i=1}^{K} (\sqrt{p_i} - \sqrt{q_i})^2} \quad (4)$$

Note that this metric can easily be shown to be the same, modulo a factor of $\sqrt{2}$, as that known elsewhere in the prior art.

At each iteration of the ABCshift algorithm, the Bhattacharyya metric is evaluated between the static object distribution, $P(\overline{C}|O)$, and the continuously relearned search window distribution, $P(\overline{C})$ (which implicitly encodes the background distribution, $P(\overline{C}|B)$). If the Bhattacharyya metric approaches zero, it is inferred that the search window is approaching the true object region size while the estimated object region is collapsing. Both windows are therefore resized by the factor r. In practice it is useful to resize when the Bhattacharyya metric drops below a preset threshold. In a disclosed embodiment of the present invention, it was found that useful threshold values typically lay between 0.2 and 0.7, however other threshold values may also be useful and appropriate and are included within the scope of the present invention. Note that, because of the special way that ABCshift implicitly relearns the background by relearning the $P(\overline{C})$ histogram, the Bhattacharyya metric is used to compare this histogram with the object model, $P(\overline{C}|O)$. This is a novel application of the Bhattacharyya metric. It has previously become common in computer vision algorithms to use this metric to evaluate the similarity between a candidate image region and an object distribution for tracking (i.e., comparing the potential object with a known object, for example as is done in an embodiment of the invention of the 999 Patent). In contrast, in an embodiment of the present invention, we use the metric to compare an object distribution with a continuously relearned background distribution, inferring an error if the two begin to converge.

If Bhattacharyya re-sizing is to be used, it should be included as an additional step in the ABCshift algorithm, between steps 5 and 6 as described above, see FIG. 1. Note that many different techniques are known in the prior art for comparing two distributions, and the specific use of the Bhattacharyya metric is merely exemplary.

Example Of Data Capture And Analysis

In one possible embodiment of a system for executing the method the present invention, a video camera is used to capture a sequence of images of a scene, each such image comprising image regions representing an object to be tracked and a background. The video image is digitized and analyzed by a computer system that has been programmed to execute the algorithm disclosed on pages 6 through 10 herein (and as represented in FIG. 1). Each of said images is successively displayed on a visual display monitor but is modified to show the results of said computer analysis, in that a red square is superimposed on each image to denote the estimated size and position of the tracked object and a green square is superimposed on each image to denote the position and size of the search window. Examples images from the display, output by this embodiment, are shown in FIGS. 3, 5, 6, 7.

In another disclosed embodiment a camera was attached to a motorized pan-tilt platform via an elongated boom, such that said camera can be moved by controlling the motors of said pan-tilt platform. This apparatus is shown in FIG. 9. A computer executing the method of the present invention, tracks an object (e.g. the mobile robot vehicle in FIG. 9) and causes signals to be transmitted to the motors of the pan-tilt platform such that said camera is always moved so as to keep said tracked object within the field of view.

Enhancements

The embodiment of the present invention can be further enhanced by tracking two or more component regions of an individual object to further enhance the robustness of the tracking. For example, if the tracked object is a person then one embodiment of the present invention could be used to track the head of the person while yet others could output the positions of the torso and other body parts of the tracked person. The combined output represents a much more precise estimate of the position of the object tracked. Such an enhancement is intended to be included within the scope of the present invention.

The present invention provides a means to estimate the image position of a tracked object. This information can further be used to calculate the direction from the camera to said tracked object. If two such cameras and tracking systems are employed then the method can be enhanced by combining data about the two respective directions in order to infer the range to the object of interest and its 3D position relative to said cameras.

Benefits of the Invention

The method of the present invention enables a computer system connected to a camera to automatically track a moving object of interest by identifying the region of each successive image that represents said object. The method has advantages over the prior art, in that it provides a means of continually re-learning a characterization of the background, which enables robustness to camera motion and also enables successful tracking in difficult circumstances such as where the tracked object moves past regions of background with which it shares similar colors or other feature values. Additionally, the method provides a means whereby certain kinds of errors can be automatically detected and corrected.

Besides these broad benefits of the invention we mention some examples of specific uses of the present invention.

Automatic face tracking, e.g. as part of a perceptual user interface or for video conferencing.

Automatic surveillance tracking of pedestrians or vehicles.

Automatic filming or monitoring of wild animals or animals in captivity.

Control of motorized robotic systems. E.g. the method can be used to control a motorized pan/tilt camera mounting to reposition the camera so as to continually follow a tracked object. This could be used in conjunction with either of the above applications.

Automatic guidance of a robotic vehicle to follow a tracked object, e.g. a robot vehicle which follows a person who walks around in a museum or a factory etc.

Automatic targeting of a vehicle mounted weapons system. E.g. a robotic vehicle or human operated vehicle, equipped with a turret-mounted firearm, can be steered in an arbitrary direction while the vision algorithm automatically keeps the weapons turret pointed at a tracked target, regardless of the motion of the vehicle or the target.

Automatically keeping a vehicle mounted camera, mounted on a turret or pantilt unit, directed at an object of interest. E.g. a camera mounted on a bomb disposal robot can be automatically fixated on a suspected roadside bomb, while the robot is steered towards the suspected roadside bomb.

It should be understood that the above list of specific uses is merely exemplary. A person skilled in the art may find many different uses for which to apply the method of the present invention, without substantially deviating from the spirit of the invention.

Other Embodiments

From the foregoing description, it will thus be evident that the present invention provides a design for object tracking in video images. As various changes can be made in the above embodiments and operating methods without departing from the spirit or scope of the following claims, it is intended that all matter contained in the above description or shown in the accompanying drawings should be interpreted as illustrative and not in a limiting sense.

Variations or modifications to the design and construction of this invention, within the scope of the appended claims, may occur to those skilled in the art upon reviewing the disclosure herein. Such variations or modifications, if within the spirit of this invention, are intended to be encompassed within the scope of any claims to patent protection issuing upon this invention.

The embodiments of the invention in which we claim an exclusive property or privilege are defined as follows:

1. A method for tracking the image position of a tracked object that appears in a plurality of successive frames of an image sequence, said method comprising the following steps:
   a) initializing the method by identifying a target region in one frame of said image sequence, wherein said target region contains pixels which represent an object which a user of this method wishes to track,
   b) developing a characterization of the tracked object by developing a characterization of those pixels which lie inside said target region,
   c) defining a search window, said search window comprising a designated region of the image which is to be searched for the tracked object, said search window to have an area r times greater than the area estimated for the target region identified in step a), said parameter r being a number that said user of the method must choose according to the kind of object being tracked, d) centering said search window on the centroid of the target region identified in step a), e) positioning the search window at an initial location in a successive frame of the image sequence, f) developing a characterization of said search window's pixels at said search windows present location in the present image in the sequence, g) computing, for each pixel in the search window, the probability that the said pixel represents the tracked object, said computation making use of numerical image data associated with said pixel, said characterization of said tracked object pixels developed in step b), said characterization of said search window pixels developed in step f), and Bayes law, said pixel probabilities thereby forming a two dimensional distribution of the tracked object's location in the image, h) estimating the new object location as the centroid of said two dimensional distribution calculated in step g), i) repositioning said search window to be centered on said new object location as determined in step h), j) iteratively repeating steps f), g), h), i) until the position of said search window converges, said convergence meaning that the difference between the positions, calculated for said search window in step i) of two consecutive said iterations, falls below a threshold value, k) repeating the steps e), f), g), h), i) for each successive frame of said image sequence.

2. The method of claim 1, modified to improve computational speed such that step f) occurs only once for each successive frame, in an image sequence, and not once in each of a plurality of iterations of the method for each image frame so that step j)consists of iteratively repeating steps g),h),i) only.

3. The method of claim 1, further including an additional step, said step providing a means whereby the size of the target region is re-estimated, either once for each successive frame in an image sequence, or once within each of a plurality of iterations of steps f), g), h) and i) of the method for each frame of an image sequence.

4. The method of claim 3, further including an additional step, whereby the search window is resized as a function of the estimated size of the target region, said search window resizing to occur either once for each frame in an image sequence, or once within each of a plurality of iterations of steps [f)], [g)], [h)] and [i)] of the method.

5. The method of claim 1, further comprising an additional step including means whereby potential errors can be detected by comparing a continuously relearned background characterization or search window characterization against the characterization known for the tracked object, a potential error being deemed likely if the compared characterizations are deemed similar according to a statistical criterion for evaluating the similarity of two such characterizations.

6. The method of claim 4, further including an additional step, whereby erroneous excessive shrinking of said search window is automatically detected and corrected by comparing a continuously relearned background characterization or search window characterization against the characterization known for the tracked object, a potential error being deemed likely if the compared characterizations are found overly similar according to a statistical criterion for evaluating the similarity of two such characterizations, said error being corrected by re-sizing said search window.

7. The method of claim 1, wherein the method is initialized by designating a target region, said target region being composed of pixels, which represent said tracked object, wherein said initialization comprises a method chosen from:

a) a human user manually designating a region of said first image to represent the target region, b) a human user using a computer point device to specify a single point with the image region, with image processing methods being then used to interpret pixels in a region surrounding said user specified single point and automatically identifying those pixels which represent the tracked object, thus identifying the target region c) a human user viewing video footage of the scene in which tracking is to be undertaken being displayed on a screen or other viewing device; a region of the viewed scene being defined or otherwise highlighted; when an object of interest enters said defined region, a human user indicating object presence to a computer; said computer then carrying out the method of claim 1, using the highlighted region as the target region d) automatically detecting objects of interest in successive frames of a video sequence using tracking methods known in the art; then said tracking method determining the appropriate region in an initial frame of a further sequence of images, which can be used as the target region e) a model of the object to be tracked being learned offline using a series of images or photographs that represent said object, t) searching for a region in the first frame to be tracked such that said region is similar to a model of the tracked object previously learned offline.

8. The method of claim 1, wherein steps b) and f) comprise forming characterizations of image features, wherein said features comprise assignations of numerical values to image pixels.

9. The method of claim 8, wherein the feature is selected from the group of color or texture features.

10. The method of claim 8, wherein said characterizations are expressed as a histogram.

11. The method of claim 8, wherein said characterizations are expressed as a parametric or non-parametric probability distribution.

12. The method of claim 1, including a means whereby the characterization of the tracked object is continually updated or relearned in successive frames of an image sequence.

13. The method of claim 1, where said method is used as part of a system whereby a camera is mounted on a motorized or actuated system, whereby the motion of said camera is controlled such that a tracked object is kept within the field of view of said camera.

14. The method of claim 1, with the additional modification that multiple instances of said method are used to simultaneously track multiple objects which all appear within the field of view of a single camera.

15. The method of claim 1, where the method is used as part of a system whereby a camera is mounted on a motorized or actuated system, whereby the motion of said camera is controlled such that a plurality of simultaneously tracked objects are kept within the field of view of said camera.

16. The method of claim 1, wherein said step c) comprises positioning said search window at an initial location, said initial location being either the same as the final location of the search window in the previous image, or at a predicted location for the tracked object, said predicted location being estimated by extrapolating the recent trajectory of the tracked object or using a Kalman filter or other predictive filtering techniques.

17. An apparatus for tracking an object, said apparatus comprising:
a) an image capturing device, said device capturing a sequence of images featuring said object
b) an image processor responsive to successive frames of said sequence of images
c) a characterization processor for developing characterizations of said object
d) a characterization processor for developing new characterizations of a search window region for each of said successive frames
e) an object location distribution processor for using information from said object and search window characterizations to convert said images into 2D distributions of location of said object by applying Bayes law to each pixel of the search window, to calculate the probability that said pixel represents said tracked object
f) a mean shift processor for iteratively calculating the mean location of said 2D distributions
g) a controller for causing said processors to process and combining information derived from said processors to achieve tracking of said object.

18. The apparatus of claim 17 wherein said image capturing device is mounted on a motorized or actuated system, whereby the motion of said image capturing device is controlled such that a tracked object is kept within the field of view of said image capturing device.

19. The apparatus of claim 17 further comprising an error detection processor, said error detection processor comprising a means whereby potential errors can be detected by comparing a continuously relearned background characterization or search window characterization against a characterization known for a tracked object.

* * * * *